United States Patent
Kümmel et al.

(10) Patent No.: US 9,890,823 B2
(45) Date of Patent: Feb. 13, 2018

(54) FRICTION LINING ARRANGEMENT FOR A DISK BRAKE

(71) Applicant: Continental Teves AG & Co. oHG, Frankfurt (DE)

(72) Inventors: Kurt Kümmel, Bensheim (DE); Christoph Keil, Fürth (DE); Holger Marschner, Oberursel (DE); Christian Piehler, Frankfurt (DE); Silviu Socolov, Schöneck (DE)

(73) Assignee: Coninental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/036,258

(22) PCT Filed: Nov. 19, 2014

(86) PCT No.: PCT/EP2014/075062
§ 371 (c)(1),
(2) Date: May 12, 2016

(87) PCT Pub. No.: WO2015/075095
PCT Pub. Date: May 28, 2015

(65) Prior Publication Data
US 2016/0281805 A1     Sep. 29, 2016

(30) Foreign Application Priority Data

Nov. 21, 2013  (DE) .................. 10 2013 223 862
Mar. 20, 2014  (DE) .................. 10 2014 205 232

(51) Int. Cl.
*F16D 65/00*      (2006.01)
*F16D 65/092*     (2006.01)

(52) U.S. Cl.
CPC ....... *F16D 65/0018* (2013.01); *F16D 65/092* (2013.01)

(58) Field of Classification Search
CPC . F16D 65/0006; F16D 65/0018; F16D 65/092
(Continued)

(56) References Cited

U.S. PATENT DOCUMENTS 4,528,739 A * 7/1985 Kemp ............... B21J 15/02
                                            29/509
5,099,961 A    3/1992 Dreilich et al.
(Continued)

FOREIGN PATENT DOCUMENTS

DE     3918369    8/1990
DE     4127113    2/1993
(Continued)

OTHER PUBLICATIONS

EPO translation, DE 3918369 A1, Aug. 1990.*
(Continued)

*Primary Examiner* — Thomas J Williams
(74) *Attorney, Agent, or Firm* — RatnerPrestia

(57) ABSTRACT

A friction lining or structure of a vehicle disk brake, including an absorption body with a mass MT, with a rear plate including hammer-head-shaped projections and friction material, which is fastened to the rear plate, for bearing against a friction ring, and wherein the projections engage in abutments of receiving recesses in a holder profile for the tangentially fixed holding and the axially displaceable guidance, and therefore introduction of a tangentially directed circumferential force (Fu, friction force) into the holder profile induces a tensile stress in at least one projection. An absorption system for suppressing undesirable vibrations is arranged on the friction lining.

15 Claims, 3 Drawing Sheets

(58) Field of Classification Search
USPC .......................................... 188/73.36, 73.37
See application file for complete search history.

(56) References Cited

U.S. PATENT DOCUMENTS

| | | | |
|---|---|---|---|
| 5,887,686 A | 3/1999 | Tanaka | |
| 7,032,723 B2* | 4/2006 | Quaglia | F16D 65/0018 188/250 E |
| 8,205,726 B2 | 6/2012 | Schorn et al. | |
| 8,286,762 B2* | 10/2012 | Monopoli | F16D 65/0018 188/205 A |
| 8,794,397 B2 | 8/2014 | Crippa | |
| 2004/0074712 A1 | 4/2004 | Quaglia | |
| 2006/0096814 A1 | 5/2006 | Hoffrichter | |
| 2006/0266599 A1 | 11/2006 | Denys | |
| 2007/0045063 A1 | 3/2007 | Naito | |
| 2010/0219030 A1* | 9/2010 | Klimt | F16D 65/0006 188/250 F |
| 2012/0111693 A1 | 5/2012 | Chern | |
| 2015/0107086 A1* | 4/2015 | Karatas | F16D 65/0006 29/525 |
| 2015/0107946 A1* | 4/2015 | Karatas | F16D 65/0006 188/250 E |

FOREIGN PATENT DOCUMENTS

| | | | |
|---|---|---|---|
| DE | 19524736 | 1/1997 | |
| DE | 69516393 | 8/2000 | |
| DE | 10218907 | 12/2003 | |
| DE | 10305308 | 4/2004 | |
| DE | 10305308 A1 * | 4/2004 | ......... F16D 65/0006 |
| DE | 102006039886 | 3/2007 | |
| DE | 102010037034 | 2/2012 | |
| DE | 102012209335 | 12/2013 | |
| EP | 0341610 | 11/1989 | |
| EP | 0380769 | 9/1993 | |
| EP | 2174034 | 4/2010 | |
| GB | 1275075 A * | 5/1972 | ......... F16D 65/0006 |
| JP | S58018138 U | 2/1983 | |
| JP | S59004832 U | 1/1984 | |
| JP | H02245528 A | 10/1990 | |
| JP | 2007528468 A | 10/2007 | |
| JP | 2011017371 | 1/2011 | |
| JP | 2011247422 A | 12/2011 | |

OTHER PUBLICATIONS

EPO translation, DE 10305308 A1, Apr. 2004.*
German Examination Report for German Application No. 10 2014 205 232.7 dated Jan. 9, 2015.
International Search Report and Written Opinion of the International Searching Authority for International Application No. PCT/EP2014/075062 dated Feb. 18, 2015.
Notification of Reasons for Refusal for Japanese Application No. 2016-533157, dated Jul. 5, 2017, including English translation, 9 pages.
Opposition for German Application No. 10 2014 205 232, dated Apr. 18, 2016, 7 pages.
Response to Opposition for German Application No. 10 2014 205 232, dated Oct. 4, 2016, 3 pages.

* cited by examiner

FRICTION LINING ARRANGEMENT FOR A DISK BRAKE

CROSS REFERENCE TO RELATED APPLICATIONS

This application is the U.S. National Phase Application of PCT International Application No. PCT/EP2014/075062, filed Nov. 19, 2014, which claims priority to German Patent Application No. 10 2013 223 862.2, filed Nov. 21, 2013 and German Patent Application No. 10 2014 205 232.7, filed Mar. 20, 2014, the contents of such applications being incorporated by reference herein.

FIELD OF THE INVENTION

The invention relates to a structure such as in particular a friction lining arrangement for a disk brake.

BACKGROUND OF THE INVENTION

In the case of braking operations, vibrations always occur to a certain extent. The vibrations are induced by intermittent frictional engagement between friction material and brake disk into a structure which is stimulated to vibrate. As a function of the prevailing conditions in the individual case, noises resulting from this can arise which are undesirable as a comfort-reducing phenomenon. In addition to the mechanical effects such as steering instability or vibrations on body components, the acoustic effects are felt to be particularly unpleasant. As a result of a rigidly positioned additional mass, a vibrational "mistuning" of the system can be achieved. The additional mass vibrates jointly with the residual structure in terms of amplitude and frequency. One disadvantage lies in the fact that the additional mass must have comparatively large dimensions, i.e. results in weight disadvantages.

SUMMARY OF THE INVENTION

An aspect of the invention is to enable a lower cost and more efficient reduction in noise which does not unnecessarily increase the vehicle mass and also opens up advantageous manufacturing methods without impairing the performance characteristics and installation space requirements of a vehicle disk brake.

According to DE 39 18 369 A1, which is incorporated by reference a disc brake with at least one vibration-changing element is proposed in order to prevent braking noises. In particular, a measure is proposed which relates to a brake shoe with hammer head-shaped extensions. Accordingly, at least one additional mass is positioned rigidly on the hammer head-shaped extension of the back plate. A round steel which is fastened in a bore by a center of the hammer head serves this purpose so that resonant frequencies can be mistuned and displaced with respect to one another and ideally adjusted so that they do not amplify one another. The fastening of the round steel is carried out, for example, by gluing, riveting, pressing in, welding or screwing in into the bore of the back plate. Although the stated feature combination can in principle be realized at low cost, a further improved solution for the novel disk brakes is in demand, the vibration stimulation of which is based on changed framework conditions.

In order to combat noise in novel friction lining arrangements and in the case of the correspondingly formed disk brakes, an aspect of the invention therefore proposes a novel absorber system which is capable of vibration separately from the structure. The proposed measure serves the aim of at least reducing or where possible entirely eliminating noise-relevant vibrations in the circumferential direction and/or axial or other vibration plane in a predefined frequency range by virtue of the fact that energy is removed from the vibrating structure because an absorber system is stimulated separately at the same time. To this end, a novel absorber system is provided on the structure (friction lining) of a total mass, which absorber system comprises a spring with a predetermined spring rigidity and the predetermined partial mass suspended thereon which are matched to one another, and is arranged on the structure so as to be able to vibrate elastically by means of a slim limb separately from the structure. This novel absorber system comprises a spring function (e.g. integrated in the limb) and a mass. It serves to eliminate a specific disruptive frequency/frequency band of the structure. The absorber system can be integrated on a component of the structure, i.e. provided integrally thereon, or alternatively absorber the system is fastened as a separate assembly to the structure, as shown in FIG. 2-6. The mode of operation of this absorber system is based on the basic principle that the mass of the absorber system carries out a separate, coerced vibration with a separate amplitude by stimulation on the basis of the defined frequency/frequency band to be combatted, while vibration energy is removed from the vibration of the structure by stimulation of the absorber system. As a result, vibration elimination comes to a rest or to a vibration amplitude AS with subordinate intensity. A damping component or function can additionally be provided in an integrated manner without departing from the invention.

Correspondingly, in the case of a different embodiment of the invention, the additional mass is positioned on the slim limb (connecting portion) between a central portion of a back plate and a hammer head-shaped projection or on the hammer head-shaped projection and arranged so as to be able to vibrate separately thereto.

BRIEF DESCRIPTION OF THE DRAWINGS

The basic principle of the invention as well as the embodiments are described individually in greater detail on the basis of the figures.

DETAILED DESCRIPTION OF THE PREFERRED EMBODIMENTS

Figure 1:
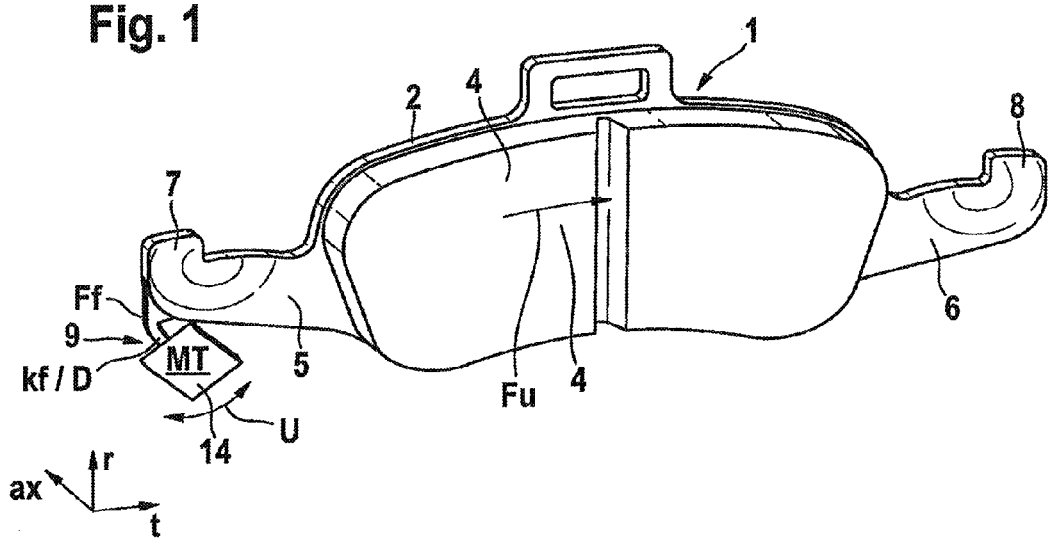
FIG. 1: Perspective frontside view of symmetric shaped friction lining configuration comprising back plate with kf/D-suspended absorber mass MT in integrated one-piece back plate embodiment (first embodiment of the invention)
Figure 2:
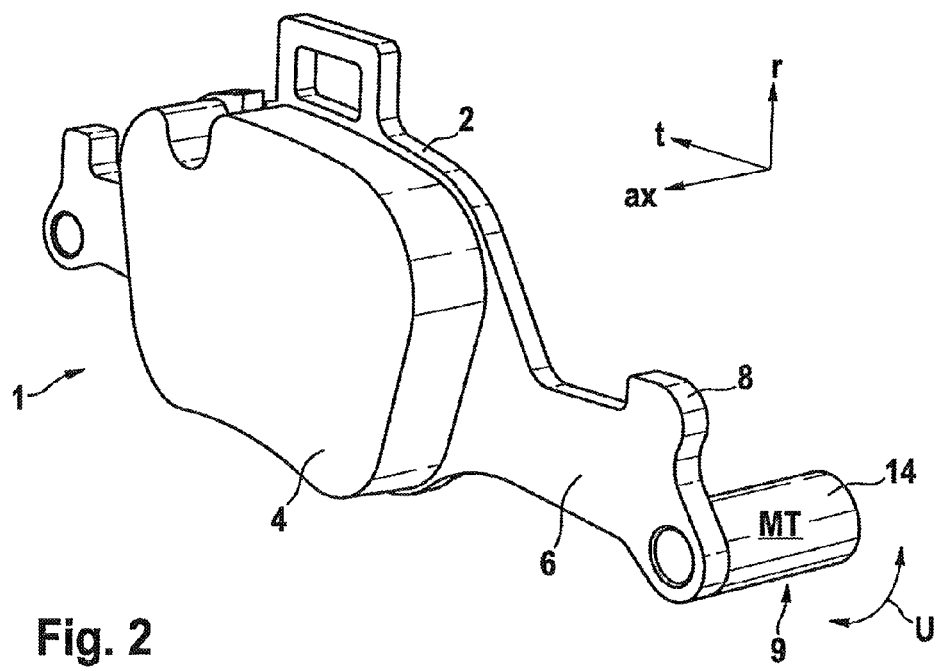
FIG. 2: Perspective frontside view of asymmetric shaped friction lining comprising back plate and D/kf-suspended extra absorber mass MT in two part configuration (second embodiment of the invention)
Figure 3:
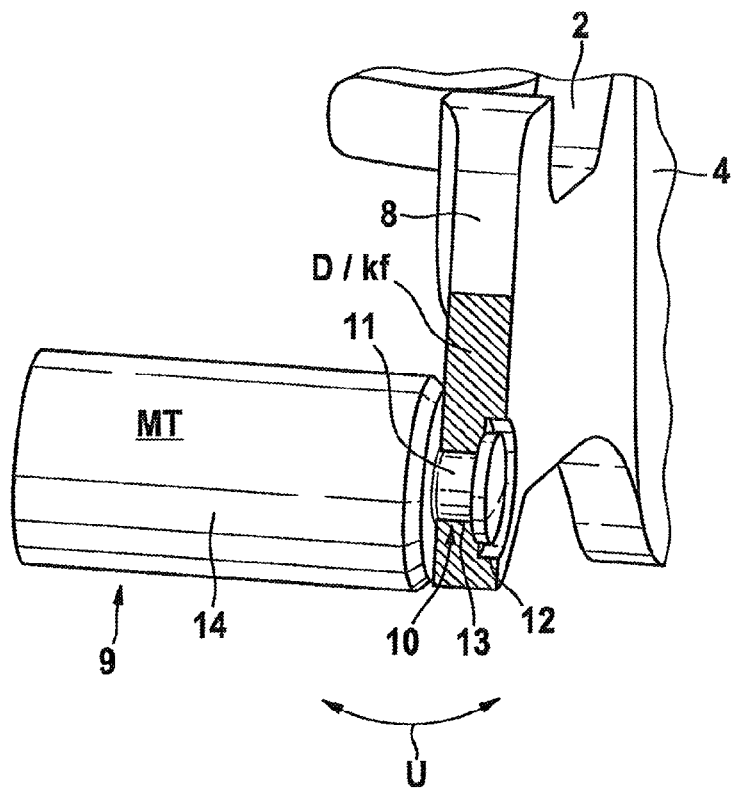
FIGS. 3 and 4: Details of the two-part D/kf-suspension configuration in sectional view based on the embodiment in FIG. 2, FIG. 5: Backside view of the isolated back plate in the second embodiment.
Figure 4:
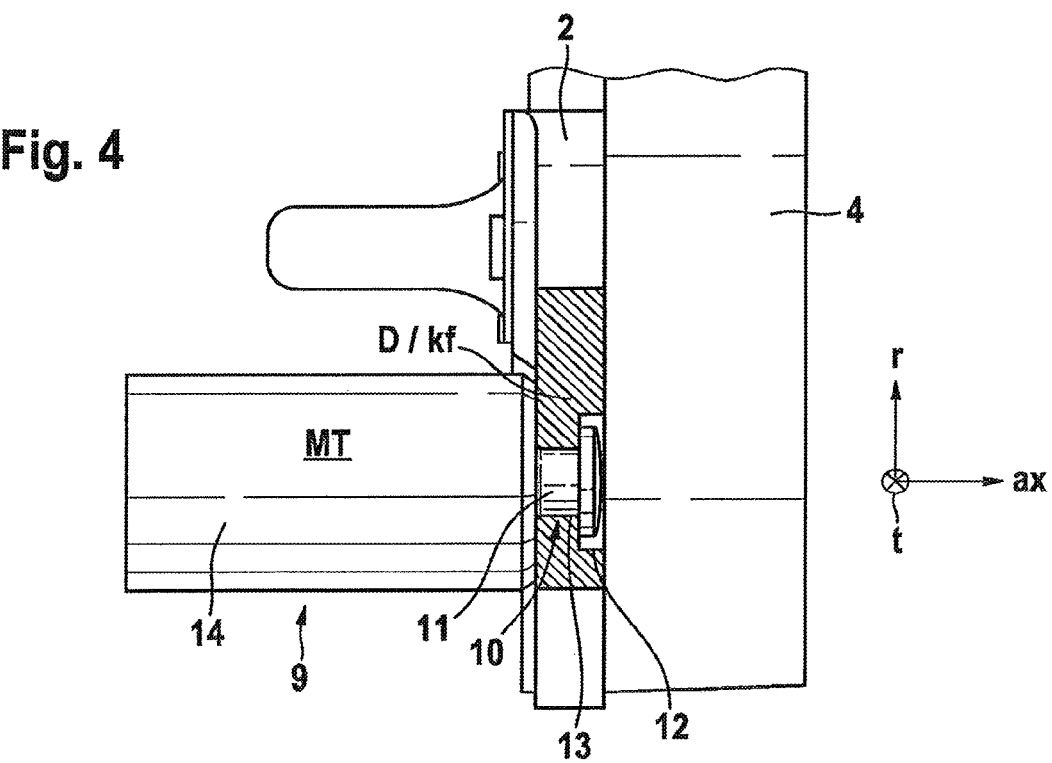
Figure 5:
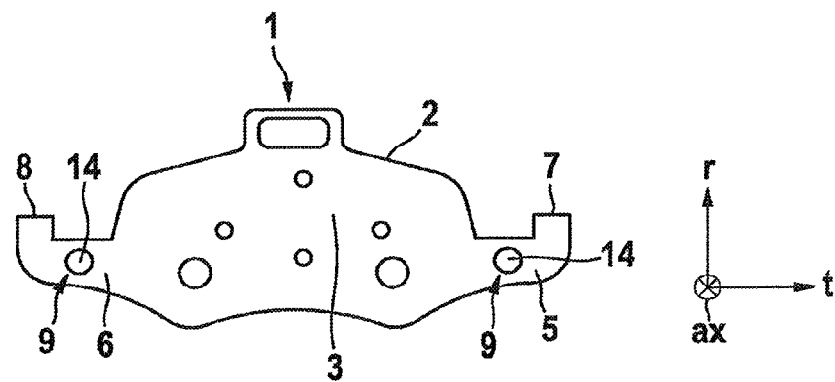

FIG. 1 shows a symmetrical friction lining 1 comprising a back plate 2. Back plate 2 is largely flat and has a central portion 3 (see FIG. 5) with a friction material 4 glued largely centrally thereon. Slim limbs (connecting portions) 5,6 which bear thickened, hammer head-shaped projections 7,8 extend in a plane with central portion 3 and projecting tangentially laterally therefrom. In particular, hammer head-shaped projections 7,8 are formed so that their bodies point radially outwards, and wherein slim limbs 5,6 bear the thickened bodies of hammer heads 7,8. These elements are therefore arranged to a certain extent as limbs arranged at a right angle to one another, and describe in principle the form of an L pointing radially outwards. Hammer head-shaped projections 7,8 are therefore connected to central portion 3 via limbs 5,6.

The forces which occur during braking are therefore transmitted from central portion 3 via limbs 5,6 and hammer head-shaped projections 7,8 radially outwards to a holder, not shown, of a fist-type caliper or to a holder profile, not shown, of a fixed caliper housing. An absorber system 9 comprising a spring/mass arrangement is fitted in the region of projections 7,8 on back plate 2, which arrangement acts energetically as absorber system 9 as a result of targeted, structurally predefined configuration of a spring rigidity kF and a correspondingly adjusted mass MT, which absorber system 9 removes disruptive vibration energy from the structure of friction lining 1. A configuration integrated in one piece can be produced in a particularly simple manner in a single pass in the case of the punching process of a back plate 2. Apart from the material outlay, this is cost-neutral and punching waste can be avoided where applicable.

The precise formation of the absorber system and its function are as follows: in order to effectively combat disruptive vibrations at friction lining 1, the vibration forms, in particular their amplitude and frequency, must be known. Determining these variables can be carried out experimentally or also computationally. The absorber system is dimensioned and used to remove vibration energy of a specific frequency/frequency band from the structure. For this purpose, absorber system 9, comprising absorber mass MT and spring kf, is adjusted in a targeted manner to frequency f to be eliminated, amplitude A and vibration plane/direction. Fastening the mass of absorber system 9 to the structure is carried out in the region of a spring foot point Ff. By virtue of the fact that the structure initially vibrates jointly (with the same frequency and amplitude) with absorber system 9, absorber system 9 is itself stimulated to relative vibrations in order to carry out separate counter-vibrations to the structure. The result of this stimulation of absorber system 9 is that vibration energy which feeds disruptive noise is removed from the structure so that the non-disruptive relative vibration (which can usually not be heard) of absorber system 9 can be carried out. As a result, a disruptive noise emission of the structure is reduced or entirely eliminated in accordance with the level of energy removal.

In the case of the integrated configuration according to FIG. 1, absorber system 9 is a one-piece component of back plate 2 which is formed integrally without additional outlay during the manufacturing process (punching) of back plate 2.

The absorber mass and absorber spring are defined according to FIG. 1 by suitable embodiment/configuration of its geometry so that the desired resonant frequency is produced in the desired vibration direction, in particular in the tangential direction. The connection between mass and the structure is configured and defined as a largely pliable absorber spring. Its rigidity is determined by a modulus of elasticity of the back plate material and by the physical framework conditions and the geometry of the determining variables. The masses and their (spring) rigidities are in a defined ratio to one another in order to ensure the demanded stimulation/resonant frequency.

Because back plates 2 are generally produced by punching out of strip-shaped steel sheet material, absorber system 9 can be easily represented as an integrated component of back plate 2 in the case of this punching process.

In one configuration of the invention, a damper D and/or a damper component can be added in an integrated manner parallel to the absorber spring.

Spatial axes t,ax,r in the figures define tangential direction, axial direction and radial direction in each case in relation to a wheel rotational axis which is standardized as the axial direction.

The solution described below to the problem according to FIGS. 2-6 is based in principle on the same functional principle, hence corresponding features are provided with corresponding reference numbers. As a result, reference is made to the previous description. Below is the detailed description of the differences. This involves in each case a solution of a multi-piece construction, wherein absorber system 9 is positioned substantially centrally or at the end side of limb 5,6 and capable of vibration separately from the structure. Each absorber system 9 is fastened, in particular wobble riveted, in each case in a through-bore 10 of back plate 2 with a thin fastening pin 11 so that an axial direction ax directed in principle axially from absorber system 9 is therefore arranged parallel to a wheel rotation axis and largely centrally in limb 5,6. Through-bore 10 is formed to be stepped, wherein its expanded diameter portion 12 is at least approximately 1.1 times a simple diameter portion 13.

At the same time, expanded diameter portion 12 with the fastening of fastening pin 11 is located on the friction lining side of back plate 2. Absorber system 9 is as a result positioned to be separately capable of vibration on a side, which faces away from the friction lining, of back plate 2. Energy transfer is optimized by the spatial proximity of absorber system 9 in relation to central portion 3. As a result, absorber system 9 is particularly efficient, simple and installation space-saving.

Although sufficient vibration capacity and inherent elasticity is in principle made available for vibrations of absorber system 9 (vibration U) preferably about radial direction r (vertical axis) as a result of slim limb 5,6, it is additionally conceivable to additionally provide, between absorber system 9 and back plate 2, a further elasticity such as, for example, a corrugated spring or an insert/intermediate layer composed of an elastic material such as in particular adhesive, plastic or elastomer. As a result, it is enabled in particular that absorber system 9 can also vibrate about other or additional axes than only radial direction r.

Figure 6:
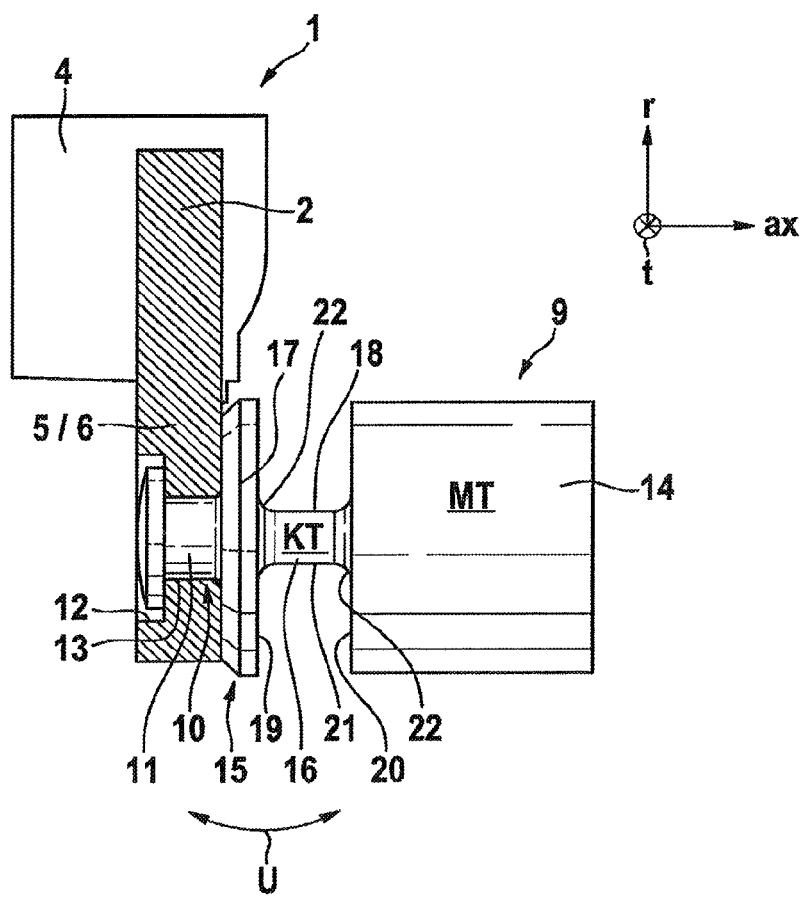
FIG. 6: two part configuration embodiment comprising a variation with respect to KT-suspension configuration of the absorber Mass MT.

FIG. 6 is based on such an additional elasticity without a preferred orientation and enables a particularly effective and simultaneously low-weight, i.e. economical variant on the basis of a particular interface between absorber system 9 and back plate 2. This particularly flexible connection of absorber mass MT can be formed with reduced weight in comparison to the solutions according to FIGS. 1-5. Absorber body 14 has a thickened foot 15 with a shoulder 17 for fastening to back plate 2, and wherein absorber body 14 and foot 15 are connected to one another via a particularly elastic connecting portion 16 configured as a round pin. This symmetrical and particularly thin round pin enables vibrations without specifying a preferred orientation. For example, absorber system 9 is manufactured as an axially symmetrical, cylindrical rotary part from a round steel, wherein connecting portion 16 is formed by a groove 18 pierced in the radial direction comprising groove flanks 19,20 and a groove base 21. In each case a rounding with a radius 22 is provided in a transition region between groove flanks 19,20 and groove base 21.

Modifications of the invention are possible, wherein a wide variety of feature combinations or mixed forms between the disclosed embodiments are also conceivable without departing from the basic concept of the invention.

LIST OF REFERENCE NUMERALS

1 Friction lining
2 Back plate
3 Central portion
4 Friction material
5 Limb
6 Limb
7 Projection
8 Projection
9 Absorber system
10 Through-bore
11 Fastening pin
12 Diameter portion
13 Diameter portion
14 Absorber body
15 Foot
16 Connecting portion
17 Shoulder
18 Groove
19, 20 Groove flanks
21 Groove base
22 Radius
MT Absorber mass
D Damper
kf Spring rigidity
Ff Spring foot point
Fu Circumferential force (friction force)
ax Axial direction (parallel to the wheel rotational axis)
r Radial direction
t Tangential direction
U Vibration

The invention claimed is:

1. A friction lining with a mass comprising:
a back plate with a central portion which is provided via limbs with hammer head-shaped projections, the back plate having first and second opposed surfaces;
a friction material fastened to the first surface of the back plate for bearing on a friction ring,
wherein the projections engage in counter bearings for tangentially fixed holding and for axially displaceable guidance so that an introduction of a tangentially directed circumferential force into the counter bearings induces a tensile load in at least one of the projection, and
an absorber system is connected to the back plate so as to be capable of vibration separate from and relative to the back plate in order to eliminate undesirable vibrations, the absorber system comprising an absorber body and a foot formed in one piece, the foot positioned against the second surface of the back plate.

2. The friction lining as claimed in claim 1, wherein the absorber system further comprises an absorber spring element with a defined spring rigidity kT extending between the foot and the absorber body so that the absorber body can vibrate relative to the back plate such that energy is removed from the structure/friction lining by vibration stimulation of the absorber body, the absorber spring element formed in one piece with the absorber body and the foot.

3. The friction lining as claimed in claim 1, wherein the absorber system is additionally assigned a damper D and/or a damper component.

4. The friction lining as claimed in claim 1, wherein the absorber system is arranged on the hammer head-shaped projection of the back plate in the center of the limb, which limb connects the hammer head-shaped projection to the central portion of the back plate.

5. The friction lining as claimed in claim 1, wherein the absorber system is formed as a separate component which is fixed on the back plate so as to be able to vibrate.

6. The friction lining as claimed in claim 1, wherein the absorber body and the foot are connected to one another via an elastic connecting portion.

7. The friction lining as claimed in claim 6, wherein the connecting portion is formed by a groove comprising groove flanks and a groove base and a transition region between the groove flanks and the groove base is provided in a rounded manner with a radius.

8. The friction lining as claimed in claim 6, wherein, the foot of the absorber system is provided with at least one shoulder for resting on the back plate and a fastening pin projects axially from the shoulder and engages through a through-bore of the back plate and a free end of the fastening pin is formed to be thickened, for the purpose of positive-locking fastening of the absorber system.

9. The friction lining as claimed in claim 8, wherein the through-bore is formed as a stepped bore coaxially to the fastening pin, wherein a first diameter region of the stepped bore accommodates the fastening pin and wherein a second diameter region of the stepped bore accommodates the thickened end of the fastening pin and wherein the second diameter region is at least approximately 1.1 times larger than the first diameter region.

10. The friction lining as claimed in claim 9, wherein the second diameter region is arranged on the back plate on the friction lining side.

11. The friction lining as claimed in claim 1, wherein at least one defined elasticity is provided between the absorber system and the back plate.

12. The friction lining as claimed in claim 1, wherein the absorber system is disposed approximately centrally on the limb or on the hammer head-shaped projection.

13. The friction lining as claimed in claim 6, wherein, the foot of the absorber system is provided with at least one shoulder for resting on the back plate and a fastening pin projects axially from the shoulder and engages through a through-bore of the back plate and a free end of the fastening pin is formed to be wobble riveted for the purpose of positive-locking fastening of the absorber system.

14. The friction lining as claimed in claim 1, wherein the absorber system and the back plate are elastically clamped to one another.

15. The friction lining as claimed in claim 2, wherein the absorber system is additionally assigned a damper D and/or a damper component.

* * * * *